2,816,130

PREPARATION OF β,β'-OXYDIPROPIONITRILE

William H. Selcer and Donald D. De Borde, Texas City, Tex., assignors to Monsanto Chemical Company, St. Louis, Mo., a corporation of Delaware No Drawing. Application April 6, 1955, Serial No. 499,752

6 Claims. (Cl. 260—465.6)

The present invention relates to an improved process for the production of β,β'-oxydipropionitrile.

It is already known that acrylonitrile may be reacted with water to produce β,β'-oxydipropionitrile in good yield according to the following equation:

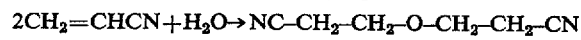

$$2CH_2=CHCN + H_2O \rightarrow NC-CH_2-CH_2-O-CH_2-CH_2-CN$$

The reaction is described as being carried out at a temperature within the range from about 20° to about 80° C. in the presence of catalytic amounts of alkali metal and alkaline earth metal hydroxides and alkali metal and alkaline earth metal salts of weak acids. However, it has been found that the product of such a reaction using the theoretical quantities of the reactants is characterized by a deep red wine color presumably due to the presence of some by-product formed in the reaction. Such color is obviously undesirable particularly since it is not removable by the usual methods of treatment such as passage through a bed of carbon or extraction by common solvents. Only a costly and tedious distillation under vacuum which is difficult to control because of the possibility of decomposition of the dicyano diethyl ether will improve its color.

It has now been discovered that the β,β'-oxydipropionitrile product from the reaction of acrylonitrile and water may be prepared free of such intense color by carefully controlling the ratio of reactants and the temperature at which the reaction is conducted. According to the invention, at least four moles of acrylonitrile is refluxed with one mole of water in the presence of an alkaline catalyst until the temperature of the boiling mixtures reaches 75° C. at which time the reaction is stopped by neutralization with sulfuric acid. Unreacted acrylonitrile and water are removed by flash distillation under vacuum, the residue is then filtered and the β,β'-oxydipropionitrile product thus recovered has a pale yellow coloration.

The following example serves to illustrate the process of the invention but it is not to be construed as limiting it in any manner except as it is limited by the appended claims.

Example

In two separate runs, the quantities of acrylonitrile, water and sodium hydroxide (pellets) indicated in the table below were charged to a 50-gallon, glass-lined, jacketed Pfaudler kettle equipped with a stirrer and reflux condenser. Heat was supplied by means of steam and the mixture was heated to boiling which began at approximately 70–71° C. In run 1, reflux was continued until the temperature reached 77–78° at which time the indicated quantities of concentrated $H_2SO_4$ (96–98%) were added to stop the reaction. In run 2, the acid was added as soon as the temperature reached 75° C. Unreacted acrylonitrile and water were removed by flash distillation of the reaction mixture under vacuum (40 mm. Hg) and a reboiler temperature not in excess of 100° C. The resulting residue was filtered to remove the sodium sulfate formed and recover the β,β'-oxydipropionitrile. The product from run 1 in which the theoretical quantities of two moles of acrylonitrile and one mole of water were employed had a deep red color whereas that from run 2 wherein 5.0 moles of acrylonitrile were employed per mole of water had a pale yellow color.

| | Run 1 | Run 2 |
|---|---|---|
| Charge (lb.): | | |
| Acrylonitrile | 143.0 | 214 |
| Water | 24.2 | 14.5 |
| Sodium Hydroxide | 0.24 | 0.145 |
| Mole Ratio, Acrylonitrile/$H_2O$ | 2/1 | 5/1 |
| Excess Acrylonitrile, Percent | 0 | 150 |
| Reaction Temperature, ° C. | 70–77 | 70–75 |
| $H_2SO_4$, lb | 0.31 | 0.186 |

At least four moles of the nitrile per mole of water or a 100% excess of nitrile must be employed to secure the desired quantity of product. Larger quantities or an excess of acrylonitrile greater than 100% of the theoretical may be used, however, with the optimum amount being determined by practical considerations relating to the recovery and recycle of acrylonitrile to the reaction.

Catalysts other than the sodium hydroxide employed in the example may be used. Equally suitable are the other alkali metal hydroxides such as potassium and lithium hydroxide, the alkaline earth metal hydroxides such as calcium and barium hydroxides, and the alkali metal and alkaline earth salts of weak acids such as sodium carbonate, potassium phosphate, calcium acetate, and the like.

The quantities employed are those usually understood as "catalytic" i. e., from about 0.1 to about 10% by weight of the reactants.

What is claimed is:

1. A process for the preparation of β,β'-oxydipropionitrile which comprises refluxing, at a temperature below 75° C. and in the presence of an alkaline catalyst, a mixture of acrylonitrile and water such that there is present at least four moles of acrylonitrile per mole of water.

2. A process for the preparation of β,β'-oxydipropionitrile which comprises refluxing, at a temperature below 75° C., a mixture of acrylonitrile and water such that there is present at least four moles of acrylonitrile per mole of water and in the presence of a catalyst chosen from the group consisting of the alkali metal hydroxides, the alkaline earth metal hydroxides and the alkali metal and the alkaline earth metal salts of weak acids.

3. A process for the preparation of β,β'-oxydipropionitrile which comprises refluxing, at a temperature below 75° C. and in the presence of a catalytic quantity of sodium hydroxide, a mixture of acrylonitrile and water such that there is present at least four moles of acrylonitrile per mole of water.

4. A process for the preparation of β,β'-oxydipropionitrile which comprises refluxing a mixture of acrylonitrile and water such that there is present at least four moles of acrylonitrile per mole of water in the presence of an alkaline catalyst and stopping the reaction when the reaction temperature reaches 75° C.

5. A process for the preparation of β,β'-oxydipropionitrile which comprises refluxing a mixture of acrylonitrile and water such that there is present at least four moles of acrylonitrile per mole of water in the presence of an alkaline catalyst chosen from the group consisting of the alkali metal hydroxides, the alkaline earth metal hydroxides, and the alkali metal and the alkaline earth metal salts of weak acids and stopping the reaction when the temperature reaches 75° C.

6. A process for the preparation of β,β'-oxydipropionitrile which comprises refluxing a mixture of acrylonitrile and water such that there is present at least four moles of acrylonitrile per mole of water in the presence of a catalytic amount of sodium hydroxide and stopping the reaction when the reaction temperature reaches 75° C.

References Cited in the file of this patent

UNITED STATES PATENTS 2,448,979     Hopff et al. _____ Sept. 7, 1948

U. S. DEPARTMENT OF COMMERCE
PATENT OFFICE

CERTIFICATE OF CORRECTION

Patent No. 2,816,130                                                                        December 10, 1957

William H. Selcer et al.

It is hereby certified that error appears in the printed specification of the above numbered patent requiring correction and that the said Letters Patent should read as corrected below.

Column 2, line 22, for "quantity" read -- quality --.

Signed and sealed this 1st day of April 1958.

(SEAL)
Attest:

KARL H. AXLINE                                                                       ROBERT C. WATSON
Attesting Officer                                                          Commissioner of Patents